US012305877B2

(12) United States Patent
Tok et al.

(10) Patent No.: US 12,305,877 B2
(45) Date of Patent: May 20, 2025

(54) AIR CONDITIONING-RELATED EQUIPMENT AND AIR CONDITIONING SYSTEM

(71) Applicant: DAIKIN INDUSTRIES, LTD., Osaka (JP)

(72) Inventors: Chang Wenn Tok, Osaka (JP); Shin Higashiyama, Osaka (JP); Kosuke Hotta, Osaka (JP); Takafusa Miura, Osaka (JP); Kensuke Urata, Osaka (JP); Keita Kodera, Osaka (JP); Ryosuke Yamamoto, Osaka (JP); Yohei Koyama, Osaka (JP); Shinichi Ishizeki, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/852,510

(22) PCT Filed: Mar. 29, 2023

(86) PCT No.: PCT/JP2023/012718
§ 371 (c)(1),
(2) Date: Sep. 30, 2024

(87) PCT Pub. No.: WO2023/190632
PCT Pub. Date: Oct. 5, 2023

(65) Prior Publication Data
US 2025/0102181 A1  Mar. 27, 2025

(30) Foreign Application Priority Data

Mar. 31, 2022  (JP) .................................. 2022-061066

(51) Int. Cl.
*F24F 11/88* (2018.01)
*H04B 3/54* (2006.01)

(52) U.S. Cl.
CPC ................ *F24F 11/88* (2018.01); *H04B 3/54* (2013.01)

(58) Field of Classification Search
CPC .. F24F 11/88; F24F 11/50; H04B 3/54; H04B 3/56
See application file for complete search history.

(56) References Cited

U.S. PATENT DOCUMENTS 6,290,141 B1 9/2001 Park et al.
2012/0033745 A1 2/2012 Jo et al.
(Continued)

FOREIGN PATENT DOCUMENTS

EP      3933290 A1    1/2022
JP   2005-159921 A    6/2005
(Continued)

OTHER PUBLICATIONS

International Search Report and Written Opinion mailed on May 23, 2023, received for PCT Application PCT/JP2023/012718, filed on Mar. 29, 2023, 14 pages including English Translation.
(Continued)

*Primary Examiner* — Marc E Norman
(74) *Attorney, Agent, or Firm* — XSENSUS LLP

(57) ABSTRACT

Air conditioning-related equipment includes: a first connection portion to which wiring for transmitting high voltage along with communication is connected; a second connection portion to which wiring dedicated to communication and not to power transmission or wiring for transmitting low voltage along with communication is connected; and a connection circuit that connects the first connection portion and the second connection portion, wherein the connection circuit includes an isolation circuit that blocks power transmission and transmits a signal pertaining to communication.

9 Claims, 4 Drawing Sheets

(56) References Cited

U.S. PATENT DOCUMENTS

| | | | |
|---|---|---|---|
| 2015/0008762 A1* | 1/2015 | Higashiyama | F24F 1/20 |
| | | | 307/113 |
| 2017/0307238 A1 | 10/2017 | Nakatsu et al. | |
| 2020/0158364 A1* | 5/2020 | Su | H04B 3/02 |
| 2024/0102688 A1* | 3/2024 | Yamamoto | H04B 3/54 |
| 2024/0401840 A1* | 12/2024 | Koyama | F24F 11/56 |

FOREIGN PATENT DOCUMENTS

| | | |
|---|---|---|
| JP | 2016-099020 A | 5/2016 |
| JP | 2017-211143 A | 11/2017 |
| JP | 2019-100655 A | 6/2019 |
| JP | 2022-185182 A | 12/2022 |
| WO | 2004/114543 A1 | 12/2004 |
| WO | 2012/114421 A1 | 8/2012 |
| WO | 2020/174563 A1 | 9/2020 |
| WO | 2022/255330 A1 | 12/2022 |

OTHER PUBLICATIONS

Notice of Reasons for Refusal mailed on May 16, 2023, received for JP Application 2022-061066, 08 pages including English Translation.
Decision to Grant a Patent mailed on Oct. 10, 2023, received for JP Application 2022-061066, 05 pages including English Translation.

* cited by examiner

ABSTRACT

AIR CONDITIONING-RELATED EQUIPMENT AND AIR CONDITIONING SYSTEM

CROSS-REFERENCE TO RELATED APPLICATIONS

This application is the national phase under 35 U. S. C. § 371 of PCT International Application No. PCT/JP2023/012718 which has an International filing date of Mar. 29, 2023 and designated the United States of America, which claims priority to Japanese Patent Application No. 2022-061066 which has a filing date of Mar. 31, 2022, the entire contents of each are incorporated herein by reference.

TECHNICAL FIELD

The present disclosure relates to air conditioning-related equipment and an air conditioning system.

BACKGROUND ART

Japanese Unexamined Patent Application Publication No. 2016-99020 discloses technology for connecting an outdoor unit and an indoor unit with a dedicated communication line and transmitting signals. International Publication No. 2020/174563 discloses an air conditioner that communicates using a power line and a communication line. Japanese Unexamined Patent Application Publication No. 2005-159921 discloses a communication processing control circuit that can be used with both an alternating current (AC) power source and a direct current (DC) power source.

SUMMARY

Air conditioning-related equipment according to one aspect of the present disclosure includes: a first connection portion to which wiring for transmitting high voltage along with communication is connected; a second connection portion to which wiring dedicated to communication and not to power transmission or wiring for transmitting low voltage along with communication is connected; and a connection circuit that connects the first connection portion and the second connection portion, wherein the connection circuit includes an isolation circuit that blocks power transmission and transmits a signal pertaining to communication.

DESCRIPTION OF EMBODIMENTS

Air conditioning-related equipment and an air conditioning system according to an embodiment of the present disclosure will be described below with reference to the drawings.

<Configuration of Air Conditioning System>

Figure 1:
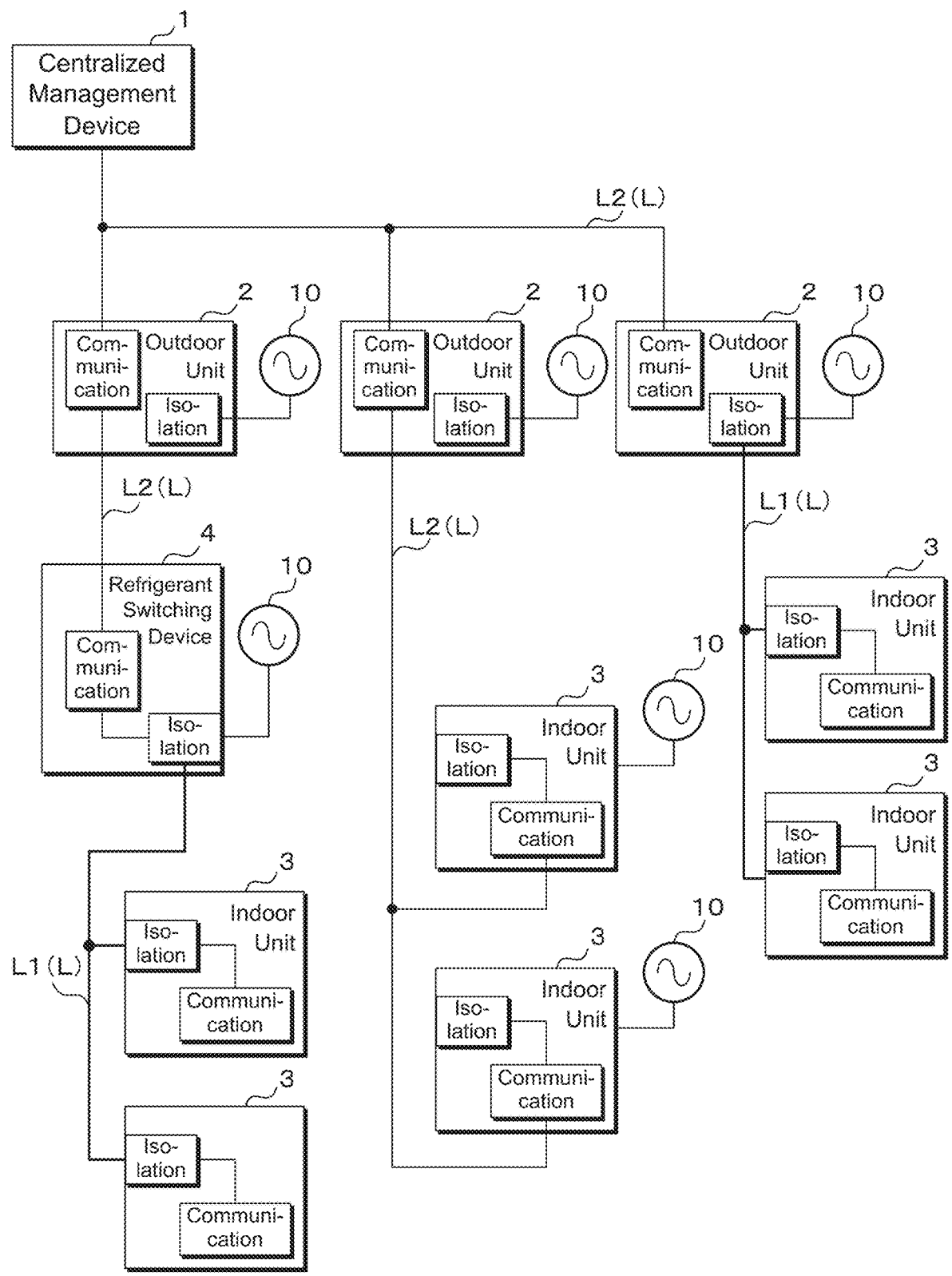
FIG. 1 is a block diagram illustrating the configuration of an air conditioning system according to a first embodiment.
Figure 2:
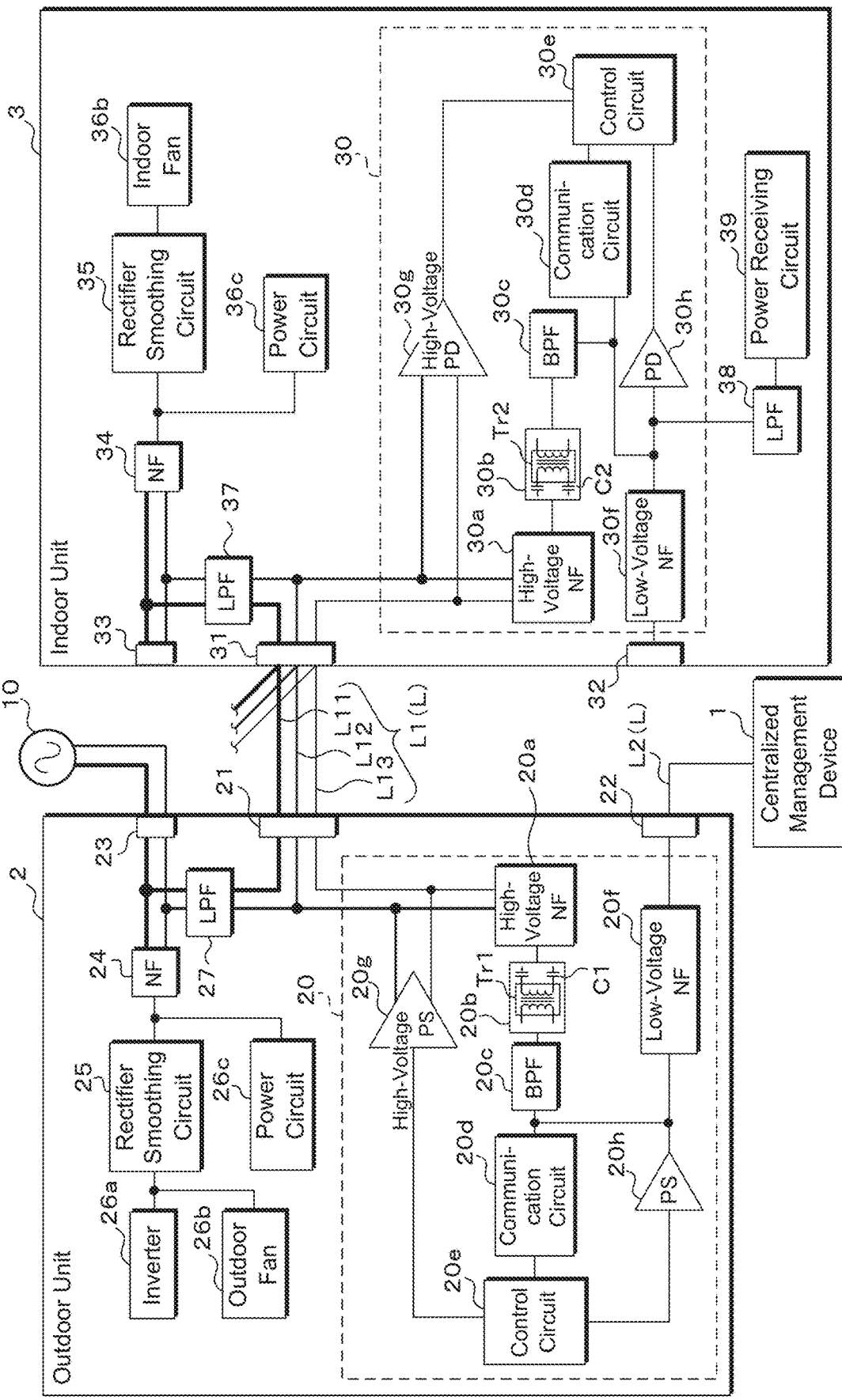
FIG. 2 is a block diagram illustrating the configuration of an outdoor unit and an indoor unit according to the first embodiment.

FIG. 1 is a block diagram illustrating the configuration of an air conditioning system according to a first embodiment, and FIG. 2 is a block diagram illustrating the configuration of an outdoor unit 2 and an indoor unit 3 according to the first embodiment. The air conditioning system according to the present embodiment includes multiple pieces of air conditioning-related equipment (hereinafter may also be referred to as multiple air conditioning-related units), such as a centralized management device 1, outdoor units 2, indoor units 3, and a refrigerant switching device 4. The multiple air conditioning-related units are connected via multiple types of wiring L. The air conditioning-related equipment is not limited to the above, and includes various types of equipment related to air conditioning, such as ventilation devices, remote controllers, communication devices, or control devices.

The wiring L connecting the air conditioning-related equipment includes wiring L for transmitting high-voltage power along with communication (hereinafter referred to as a high-voltage power line L1), wiring L for transmitting low-voltage power along with communication (hereinafter referred to as a low-voltage power line L2), and wiring L dedicated to communication and not to power transmission (hereinafter referred to as a dedicated communication line). The high-voltage power line L1 is wiring L for transmitting power required to operate the drive system of a refrigerant circuit and the like. The low-voltage power line L2 is wiring L for transmitting power required to operate a control system, for example. In the example illustrated in FIG. 1, multiple air conditioning-related units are connected by the high-voltage power line L1 and the low-voltage power line L2.

Multiple outdoor units 2 are daisy-chained to the centralized management device 1 via the low-voltage power line L2. The centralized management device 1 and the outdoor units 2 can communicate via the low-voltage power line L2.

Multiple indoor units 3 are connected to a first outdoor unit 2 via the high-voltage power line L1. The outdoor unit 2 communicates with the indoor units 3 via the high-voltage power line L1, and supplies high-voltage power to the indoor units 3. The first outdoor unit 2 and the indoor units 3 form one system (for example, one refrigerant circuit).

Multiple indoor units 3 are daisy-chained to a second outdoor unit 2 via the low-voltage power line L2. The second outdoor unit 2 and the indoor units 3 can communicate via the low-voltage power line L2. The second outdoor unit 2 and the indoor units 3 form one system.

The refrigerant switching device 4 is connected to a third outdoor unit 2 via the low-voltage power line L2. Multiple indoor units 3 are daisy-chained to the refrigerant switching device 4 via the high-voltage power line L1. The third outdoor unit 2 and the refrigerant switching device 4 can communicate via the low-voltage power line L2. The refrigerant switching device 4 communicates with the indoor units 3 via the high-voltage power line L1, and supplies high-voltage power to the indoor units 3. The third outdoor unit 2 can communicate with the indoor units 3 via the low-voltage power line L2 and the high-voltage power line L1. The third outdoor unit 2, the refrigerant switching device 4, and the indoor units 3 form one system.

In the air conditioning system thus configured, the outdoor units 2 and the indoor units 3 are provided with connection circuits 20 and 30 according to the present embodiment, thereby realizing interoperable signal communication with the high-voltage power line L1 and the low-voltage power line L2. Specifically, the connection circuits 20 and 30 are provided with isolation circuits 20b and 30b, and communication circuits 20d and 30d communicating using a certain common communication protocol, thereby realizing interoperable signal communication. In FIG. 1, "communication" in the outdoor units 2 and the indoor units 3 indicate the communication circuits 20d and 30d, whereas "isolation" indicates the isolation circuits 20b and 30b. The refrigerant switching device 4 also has the same or similar circuit configuration as the outdoor units 2, and realizes interoperable signal communication.

The functions of air conditioning-related equipment capable of interoperable signal communication are as follows.

(1) The outdoor units 2, the indoor units 3, and the refrigerant switching device 4 are capable of connecting to a communication network that utilizes the high-voltage power line L1, a communication network that utilizes the low-voltage power line L2, and a communication network that utilizes the dedicated communication line.

(2) The outdoor units 2, the indoor units 3, and the refrigerant switching device 4 can be daisy-chained using different types of wiring L, and the individual air conditioning-related units can directly exchange signals through the multiple types of wiring L. The air conditioning-related equipment can communicate as if various types of air conditioning-related equipment were daisy-chained on the wiring L of the same system. Signals pertaining to communication are transmitted from the low-voltage power line L2 to the high-voltage power line L1, and from the high-voltage power line L1 to the low-voltage power line L2 via the isolation circuits 20b and 30b. Similarly, signals pertaining to communication are transmitted from the dedicated communication line to the high-voltage power line L1, and from the high-voltage power line L1 to the dedicated communication line via the isolation circuits 20b and 30b.

(3) The outdoor units 2, the indoor units 3, and the refrigerant switching device 4 can communicate using a common communication protocol, regardless of the type and system of communication network.

<Outdoor Unit 2 and Indoor Unit 3 Connected Via High-Voltage Power Line L1>

The outdoor unit 2 and the indoor unit 3 illustrated in FIG. 2 are connected via the high-voltage power line L1. The high-voltage power line L1 includes a power line L11, a shared line L12, and a signal line L13. The shared line L12 is, for example, an electric wire connected to a reference potential. For example, the shared line L12 is an electric wire grounded to 0 V. The power line L11 is an electric wire for transmitting high-voltage power. The signal line L13 is an electric wire for communication between air conditioning-related units. The outdoor unit 2 and the indoor unit 3 transmit high-voltage power using the power line L11 and the shared line L12, and communicate via the shared line L12 and the signal line L13.

Since signals pertaining to communication are transmitted through the shared line L12 connected to the reference potential and the signal line L13, signals pertaining to communication can be prevented from leaking to an external power system through the power line L13.

The outdoor unit 2 includes a first connection portion 21 to which the high-voltage power line L1 is connected, a second connection portion 22 to which the low-voltage power line L2 or the dedicated communication line is connected, and a third connection portion 23 having a power terminal to which an AC power source 10 is connected. The outdoor unit 2 includes the connection circuit 20 connecting the first connection portion 21 and the second connection portion 22.

The first connection portion 21 of the outdoor unit 2 includes receptacles to which the power line L11, the shared line L12, and the signal line L13 of the high-voltage power line L1 are connected. The first connection portion 21 includes two or more sets of receptacles for connecting to other air conditioning-related equipment in a daisy-chain configuration. The receptacles' corresponding terminals are connected. That is, a first receptacle includes a terminal to which the power line L11 of the high-voltage power line L1 is connected, a terminal to which the shared line L12 is connected, and a terminal to which the signal line L13 is connected. A second receptacle also includes a terminal to which the power line L11 of the high-voltage power line L1 is connected, a terminal to which the shared line L12 is connected, and a terminal to which the signal line L13 is connected. The receptacles' terminals to which the power line L11 is connected are connected. The receptacles' terminals to which the shared line L12 is connected are connected. The receptacles' terminals to which the signal line L13 is connected are connected.

The second connection portion 22 of the outdoor unit 2 includes receptacles to which the low-voltage power line L2 or the dedicated communication line is connected. The second connection portion 22 includes two or more sets of receptacles for connecting to other air conditioning-related equipment in a daisy-chain configuration. The low-voltage power line L2 and the dedicated communication line each have two wires, and each receptacle includes terminals to which these two wires are connected. The receptacles' corresponding terminals are connected.

The indoor unit 3 includes a first connection portion 31 to which the high-voltage power line L1 is connected, a second connection portion 32 to which the low-voltage power line L2 or the dedicated communication line is connected, and a third connection portion 33 to which the AC power source 10 is connected. The indoor unit 3 includes the connection circuit 30 connecting the first connection portion 31 and the second connection portion 32.

The first connection portion 31 of the indoor unit 3 includes receptacles to which the power line L11, the shared line L12, and the signal line L13 of the high-voltage power line L1 are connected. The first connection portion 31 includes two or more sets of receptacles for connecting to other air conditioning-related equipment in a daisy-chain configuration.

The second connection portion 32 of the indoor unit 3 includes receptacles to which the low-voltage power line L2 or the dedicated communication line is connected. The second connection portion 32 includes two or more sets of receptacles for connecting to other air conditioning-related equipment in a daisy-chain configuration. The low-voltage power line L2 and the dedicated communication line each have two wires, and each receptacle includes terminals to which these two wires are connected. The receptacles' corresponding terminals are connected.

In the example illustrated in FIG. 2, the first connection portion 21 of the outdoor unit 2 and the first connection portion 31 of the indoor unit 3 are connected via the high-voltage power line L1. The second connection portion 22 of the outdoor unit 2 and the centralized management device 1 are connected via the low-voltage power line L2. The AC power source 10 is connected to the third connection portion 23 of the outdoor unit 2. The wiring L and the AC power source 10 are not connected to the second connection portion 32 and the third connection portion 33 of the indoor unit 3.

<Configuration of Connection Circuit 20 of Outdoor Unit 2>

The connection circuit 20 of the outdoor unit 2 is a circuit that connects the first connection portion 21 and the second connection portion 22 of the outdoor unit 2. The connection circuit 20 includes a high-voltage noise filter (high-voltage NF) 20a, the isolation circuit 20b, a band-pass filter (BPF) 20c, the communication circuit 20d, a control circuit 20e, and a low-voltage noise filter (low-voltage NF) 20f. The connection circuit 20 further includes a first transmission circuit (high voltage PS) 20g and a second transmission circuit (PS) 20h for recognizing the system in the air conditioning system. The first transmission circuit 20g and the second transmission circuit 20h will be described in detail later.

The communication circuit 20d is connected to the first connection portion 21 of the outdoor unit 2 via the high-voltage noise filter 20a, the isolation circuit 20b, and the band-pass filter 20c. In detail, internal wiring is connected to the terminals of the first connection portion 21 to which the shared line L12 and the signal line L13 of the high-voltage power line L1 are connected, and the first connection portion 21 and the communication circuit 20d are connected through the internal wiring. The high-voltage noise filter 20a is a circuit that removes noise that has entered the high-voltage power line L1. The high-voltage noise filter 20a is, for example, a common mode noise filter. The isolation circuit 20b is a circuit that blocks high-voltage power and transmits signals pertaining to communication. The isolation circuit 20b includes a transformer Tr1 and a capacitor C1 that are connected in series. For the convenience of drawing, the internal wiring connecting the high-voltage noise filter 20a and the communication circuit 20d is illustrated as a single line, but the circuits are connected by two lines of the internal wiring. Each of two terminals of a first coil constituting the transformer Tr1 is connected to the high-voltage noise filter 20a via the capacitor C1. Two terminals of a second coil constituting the transformer Tr1 are connected to the band-pass filter 20c. The band-pass filter 20c is a filter circuit that passes signal components transmitted and received between air conditioning-related units, while blocking non-signal components. For example, the band-pass filter 20c may be a high-pass filter.

Note that the isolation circuit 20b may be configured to include either the transformer Tr1 or the capacitor C1.

The communication circuit 20d is connected to the second connection portion 22 of the outdoor unit 2 via the low-voltage noise filter 20f. In detail, internal wiring is connected to the terminal of the second connection portion 22, and the second connection portion 22 and the communication circuit 20d are connected through the internal wiring. The low-voltage noise filter 20f is a circuit that removes noise that has entered the low-voltage power line L2. For the convenience of drawing, the internal wiring connecting the second connection portion 22, the low-voltage noise filter 20f, and the communication circuit 20d is illustrated as a single line, but the circuits are connected by two lines of the internal wiring.

The communication circuit 20d is, as described above, connected to the first connection portion 21 via the isolation circuit 20b, and is connected to the second connection portion 22 without the isolation circuit 20b interposed. The communication circuit 20d can communicate with external air conditioning-related equipment via the high-voltage power line L1 connected to the first connection portion 21, and can communicate with external air conditioning-related equipment via the low-voltage power line L2 or the dedicated communication line connected to the second connection portion 22. In the example illustrated in FIG. 2, the communication circuit 20d can communicate with the indoor unit 3 via the high-voltage power line L1, and can communicate with the centralized management device 1 via the low-voltage power line L2.

The control circuit 20e of the outdoor unit 2 is a circuit that controls the transmission and reception of signals by the communication circuit 20d and controls the operation of the outdoor unit 2. A control device includes an arithmetic processing unit that executes control programs, and a storage section. The arithmetic processing unit includes, for example, a CPU (Central Processing Unit) or an MPU (Micro Processing Unit). The storage section stores control programs and information used for control processing. The storage section includes a non-volatile memory and a volatile memory.

<Configuration of Connection Circuit 30 of Indoor Unit 3>

The connection circuit 30 of the indoor unit 3 is a circuit connecting the first connection portion 31 and the second connection portion 32 of the indoor unit 3. The configuration of the connection circuit 30 of the indoor unit 3 is the same as or similar to the connection circuit 30 of the outdoor unit 2, and its detailed description will be omitted as appropriate. The connection circuit 30 includes a high-voltage noise filter (high-voltage NF) 30a, the isolation circuit 30b, a band-pass filter (BPF) 30c, the communication circuit 30d, a control circuit 30e, and a low-voltage noise filter (low-voltage NF) 30f. The connection circuit 30 further includes a first reception circuit (high-voltage PD) 30g and a second reception circuit (PD) 30h for recognizing the system in the air conditioning system. The first reception circuit 30g and the second reception circuit 30h will be described in detail later.

The communication circuit 30d is connected to the first connection portion 31 of the indoor unit 3 via the high-voltage noise filter 30a, the isolation circuit 30b, and the band-pass filter 30c. In detail, internal wiring is connected to the terminals of the first connection portion 31 to which the shared line L12 and the signal line L13 of the high-voltage power line L1 are connected, and the first connection portion 31 and the communication circuit 30d are connected through the internal wiring. The isolation circuit 30b is a circuit that blocks high-voltage power and transmits signals pertaining to communication. The isolation circuit 30b includes a transformer Tr2 and a capacitor C2 that are connected in series. Each of two terminals of a first coil constituting the transformer Tr2 is connected to the high-voltage noise filter 30a via the capacitor C2. Two terminals of a second coil constituting the transformer Tr3 are connected to the band-pass filter 30c. The band-pass filter 30c is a filter circuit that passes signal components transmitted and received between air conditioning-related units, while blocking non-signal components.

The communication circuit 30d is connected to the second connection portion 32 of the indoor unit 3 via the low-voltage noise filter 30f. In detail, internal wiring is connected to the terminal of the second connection portion 32, and the second connection portion 32 and the communication circuit 30d are connected through the internal wiring.

The communication circuit 30d is, as described above, connected to the first connection portion 31 via the isolation circuit 30b, and is connected to the second connection portion 32 without the isolation circuit 30b interposed. The communication circuit 30d can communicate with external air conditioning-related equipment via the high-voltage power line L1 connected to the first connection portion 31, and can communicate with external air conditioning-related equipment via the low-voltage power line L2 or the dedicated communication line connected to the second connection portion 32. In the example illustrated in FIG. 2, the communication circuit 30d can communicate with the outdoor unit 2 via the high-voltage power line L1.

The control circuit 30e of the indoor unit 3 is a circuit that controls the transmission and reception of signals by the communication circuit 30d and controls the operation of the indoor unit 3. The storage section stores control programs and information used for control processing.

<Transmission Circuit and Reception Circuit Pertaining to System Recognition>

As described above, since the outdoor units 2, indoor units 3, and refrigerant switching devices 4, which belong to multiple systems, can communicate with each other interoperably, they are unable to recognize to which system the communicating and connected air conditioning-related equipment belongs through communication using the communication circuits 20d and 30d.

Accordingly, as circuits for recognizing the system, each outdoor unit 2 according to the present embodiment includes the first transmission circuit 20g and the second transmission circuit 20h, and each indoor unit 3 includes the first reception circuit 30g and the second reception circuit 30h.

The first transmission circuit 20g of the outdoor unit 2 is a circuit that transmits, via the high-voltage power line L1, a detection signal at a lower frequency than that of a signal pertaining to communication via the high-voltage power line L1. An output terminal of the first transmission circuit 20g is connected to the first connection portion 21. Specifically, the first transmission circuit 20g is connected to the first connection portion 21 via internal wiring connected to the shared line L12 and the signal line L13 of the high-voltage power line L1. An input terminal of the first transmission circuit 20g is connected to the control circuit 20e. The control circuit 20e controls the operation of the first transmission circuit 20g. For example, the first transmission circuit 20g transmits a pulse signal encoded with the identifier of the outdoor unit 2.

The second transmission circuit 20h of the outdoor unit 2 is a circuit that transmits, via the dedicated communication line or the low-voltage power line L2, a detection signal at a lower frequency than that of a signal pertaining to communication via the dedicated communication line or the low-voltage power line L2. An output terminal of the second transmission circuit 20h is connected to the second connection portion 22. An input terminal of the second transmission circuit 20h is connected to the control circuit 20e. The control circuit 20e controls the signal transmission of the second transmission circuit 20h. For example, the second transmission circuit 20h transmits a pulse signal encoded with the identifier of the outdoor unit 2.

The first reception circuit 30g of the indoor unit 3 is a circuit that transmits, via the high-voltage power line L1, a detection signal at a lower frequency than that of a signal pertaining to communication via the high-voltage power line L1. An input terminal of the first reception circuit 30g is connected to the first connection portion 31. Specifically, the first reception circuit 30g is connected to the first connection portion 31 via internal wiring connected to the shared line L12 and the signal line L13 of the high-voltage power line L1. An output terminal of the first reception circuit 30g is connected to the control circuit 30e. The control circuit 30e receives a detection signal via the first reception circuit 30g. The control circuit 30e can obtain the identifier of the transmission source by decoding the detection signal.

The second reception circuit 30h of the indoor unit 3 is a circuit that transmits, via the dedicated communication line or the low-voltage power line L2, a detection signal at a lower frequency than that of a signal pertaining to communication via the dedicated communication line or the low-voltage power line L2. An input terminal of the second reception circuit 30h is connected to the second connection portion 32 via the low-voltage noise filter 30f. An output terminal of the second reception circuit 30h is connected to the control circuit 30e. The control circuit 30e receives a detection signal via the second reception circuit 30h. The control circuit 30e can obtain the identifier of the transmission source by decoding the detection signal.

A high-frequency transmission filter is disposed between multiple systems that form the air conditioning system illustrated in FIG. 1. That is, a high-frequency transmission filter is provided in the wiring L connecting the air conditioning related equipment that forms a first system and the air conditioning related equipment that forms a second system. The high-frequency transmission filter is a filter circuit that passes signal components transmitted and received between air conditioning-related units, while blocking the above-described detection signals. By providing the high-frequency transmission filter, the transmission range of detected signals is limited to be within one system.

In the case where the outdoor unit 2 is to recognize the system of air conditioning-related equipment connected to the high-voltage power line L1, the control circuit 20e of the outdoor unit 2 causes the first transmission circuit 20g to transmit a detection signal. The detection signal is at a lower frequency than signal components transmitted and received between air conditioning-related units, and does not pass through the high-frequency transmission filter. The detection signal only reaches the air conditioning-related equipment within the system defined by the high-frequency transmission filter. In the case where the control circuit 30e of the indoor unit 3, which is daisy-chained to the outdoor unit 2, receives a detection signal, transmitted from the outdoor unit 2, at the first reception circuit 30g, a response signal is transmitted to the outdoor unit 2 via the high-voltage power line L1. In the case where the outdoor unit 2 receives the response signal at the communication circuit 20d, the outdoor unit 2 recognizes that the outdoor unit 2, which is the transmitting source of the response signal, is air conditioning-related equipment within the same system as itself. For other air conditioning-related equipment, the transmission and reception of a detection signal and a response signal enable the air conditioning-related equipment to recognize a group of air conditioning-related units within the same system.

In the case where the outdoor unit 2 is to recognize the system of air conditioning-related equipment connected to the low-voltage power line L2 or the dedicated communication line, the control circuit 20e of the outdoor unit 2 causes the second transmission circuit 20h to transmit a detection signal. The detection signal only reaches the air conditioning-related equipment within the system defined by the high-frequency transmission filter. In the case where the control circuit 30e of the indoor unit 3, which is daisy-chained to the outdoor unit 2, receives the detection signal, transmitted from the outdoor unit 2, at the second reception circuit 30h, a response signal is transmitted to the outdoor unit 2 via the low-voltage power line L2 or the dedicated communication line. In the case where the outdoor unit 2 receives the response signal at the communication circuit 20d, the outdoor unit 2 recognizes that the outdoor unit 2, which is the transmitting source of the response signal, is air conditioning-related equipment within the same system as itself. For other air conditioning-related equipment, the transmission and reception of a detection signal and a response signal enable the air conditioning-related equipment to recognize a group of air conditioning-related units within the same system.

<Other Configurations in Outdoor Unit 2 and Indoor Unit 3>

The outdoor unit 2 and the indoor unit 3 include an outdoor unit and an indoor unit, respectively, which form an unillustrated refrigerant circuit. The outdoor unit and the indoor unit are connected via a refrigerant pipe and a closing valve. The outdoor unit includes a compressor for inhaling, compressing, and discharging refrigerant, a four-way switching valve provided in the refrigerant pipe, an outdoor heat exchanger, an expansion mechanism for decompressing the refrigerant, and the like. The expansion mechanism is, for example, an expansion valve, a capillary tube, or the like. The indoor unit includes an indoor heat exchanger and the like.

The outdoor unit 2 includes a noise filter (NF) 24, a rectifier smoothing circuit 25, an inverter 26a, an outdoor fan 26b, a power circuit 26c, and a low-pass filter (LPF) 27.

The inverter 26a and the outdoor fan 26b are connected to the third connection portion 23 of the outdoor unit 2 via the noise filter 24 and the rectifier smoothing circuit 25. The noise filter 24 removes noise that has occurred in the connection circuits 20 and 30 and noise that has entered the high-voltage power line L1. The rectifier smoothing circuit 25 is a circuit that converts AC power supplied from the AC power source 10 or external air conditioning-related equipment to DC power. The inverter 26a is a circuit that converts the DC power rectified by the rectifier smoothing circuit 25 to AC power. The outdoor unit is driven by the AC power converted by the inverter 26a. The outdoor fan 26b is driven with the DC power rectified by the rectifier smoothing circuit 25. The outdoor fan 26b blows air to the outdoor heat exchanger to facilitate heat exchange.

The power circuit 26c is connected to the third connection portion 23 of the outdoor unit 2 via the noise filter 24. The power circuit 26c is, for example, a switching power circuit. The power circuit 26c receives AC power supplied from the AC power source 10 or external air conditioning-related equipment and supplies main power to various units within the outdoor unit 2, which is the unit itself.

The third connection portion 23 of the outdoor unit 2 is connected to the first connection portion 31 via the low-pass filter 27. The low-pass filter 27 blocks signals at higher frequencies than AC power and prevents such signals from leaking from the first connection portion 31 to the outside via the third connection portion 33. In the case where the AC power source 10 is connected to the third connection portion 33 and the high-voltage power line L1 is connected to the first connection portion 31, high-voltage power of the AC power source 10 is transmitted to external air conditioning-related equipment via the third connection portion 33, the first connection portion 31, and the high-voltage power line L1. In the example illustrated in FIG. 2, high-voltage power is transmitted from the outdoor unit 2 to the indoor unit 3 via the high-voltage power line L1.

The indoor unit 3 includes a noise filter (NF) 34, a rectifier smoothing circuit 35, an indoor fan 36b, a power circuit 36c, low-pass filters (LPFs) 37 and 38, and a power receiving circuit 39.

The indoor fan 36b is connected to the third connection portion 33 of the indoor unit 3 via the noise filter 34 and the rectifier smoothing circuit 35. The noise filter 34 removes noise that has occurred in the connection circuits 20 and 30 and noise that has entered the high-voltage power line L1. The rectifier smoothing circuit 35 is a circuit that converts AC power supplied from the AC power source 10 or external air conditioning-related equipment to DC power. The indoor fan 36b is driven with the DC power rectified by the rectifier smoothing circuit 35. The indoor fan 36b blows air to the indoor heat exchanger and blows the heat-exchanged air into the indoor space.

The power circuit 36c is connected to the third connection portion 33 of the indoor unit 3 via the noise filter 24. The power circuit 36c is, for example, a switching power circuit. The power circuit 36c receives AC power supplied from the AC power source 10 or external air conditioning-related equipment and supplies main power to various devices within the indoor unit 3 itself.

The third connection portion 33 of the indoor unit 3 is connected to the first connection portion 31 via the low-pass filter 37. The low-pass filter 37 blocks signals at higher frequencies than AC power and prevents such signals from leaking from the first connection portion 31 to the outside via the third connection portion 33.

The power receiving circuit 39 is connected to the second connection portion 32 of the indoor unit 3 via the low-voltage noise filter 30f and the low-pass filter 38. The low-pass filter 38 is a circuit that removes signals pertaining to communication. The power receiving circuit 39 receives low-voltage power supplied from the outdoor unit 2, the refrigerant switching device 4, or other air conditioning-related equipment via the low-voltage power line L2, and supplies auxiliary power to various circuits within the indoor unit 3 itself.

Although an example of providing the indoor unit 3 with the low-pass filter 38 and the power receiving circuit 39 for receiving low-voltage power has been described, the outdoor unit 2 may also be provided with a circuit for receiving low-voltage power.

<Outdoor Unit 2 and Indoor Unit 3 Connected Via Low-Voltage Power Line L2>

Figure 3:
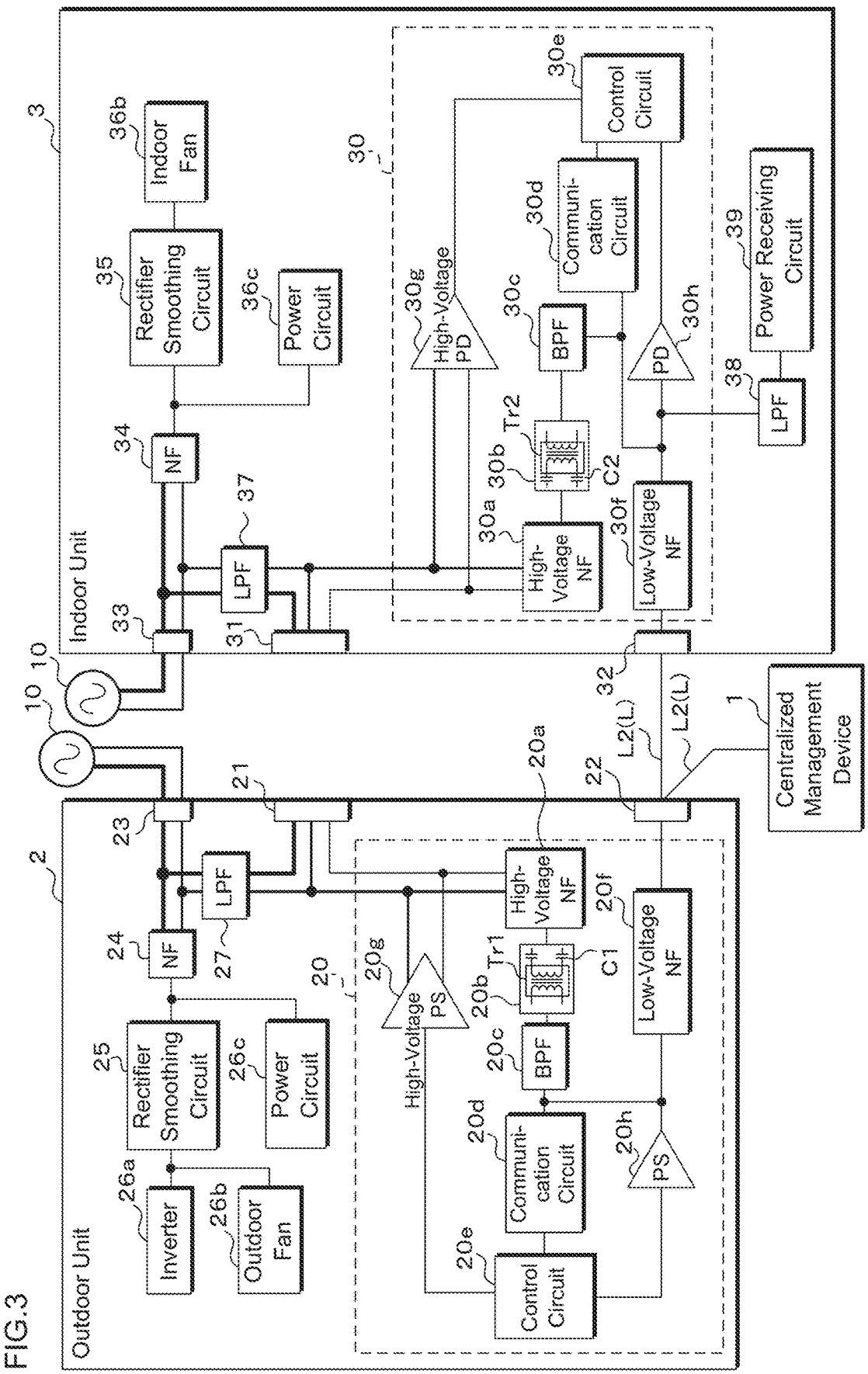
FIG. 3 is a block diagram illustrating the configuration of the outdoor unit and the indoor unit according to the first embodiment.

FIG. 3 is a block diagram illustrating the configuration of the outdoor unit 2 and the indoor unit 3 according to the first embodiment. The outdoor unit 2 and the indoor unit 3 have the same or similar configurations to those illustrated in FIG. 2. In the example illustrated in FIG. 3, the second connection portion 22 of the outdoor unit 2 and the second connection portion 32 of the indoor unit 3 are connected via the low-voltage power line L2. The second connection portion 22 of the outdoor unit 2 and the centralized management device 1 are connected via the low-voltage power line L2. The AC power source 10 is connected to the third connection portion 33 of the indoor unit 3 and the third connection portion 23 of the outdoor unit 2. No wiring L is connected to the first connection portion 21 of the outdoor unit 2 and the first connection portion 31 of the indoor unit 3.

In the example illustrated in FIG. 3, the outdoor unit 2 and the indoor unit 3 can transmit and receive signals via the low-voltage power line L2. The centralized management device 1 and the outdoor unit 2 can transmit and receive signals via the low-voltage power line L2. The centralized management device 1 and the indoor unit 3 can transmit and receive signals via the low-voltage power line L2.

The second connection portion 22 of the outdoor unit 2 and the second connection portion 32 of the indoor unit 3 can be connected via the dedicated communication line. In this case, the outdoor unit 2 and the indoor unit 3 can transmit and receive signals via the dedicated communication line.

<Refrigerant Switching Device 4>

The configuration pertaining to communication of the refrigerant switching device 4 illustrated in FIG. 1 is the same as or similar to the outdoor unit 2 or the indoor unit 3, and its detailed description is omitted. In the example illustrated in FIG. 1, the refrigerant switching device 4 is connected to the outdoor unit 2 via the low-voltage power line L2 and to the indoor units 3 via the high-voltage power line L1. The refrigerant switching device 4 and the outdoor unit 2 can transmit and receive signals via the low-voltage power line L2. The refrigerant switching device 4 and the indoor units 3 can send and receive signals via the high-voltage power line L1. The outdoor unit 2 and the indoor units 3 can transmit and receive signals via low-voltage power and the high-voltage power line L1. The centralized management device 1 can transmit and receive signals via the low-voltage power line L2 and the high-voltage power line L1.

Comparative Example with Present Embodiment

Figure 4:
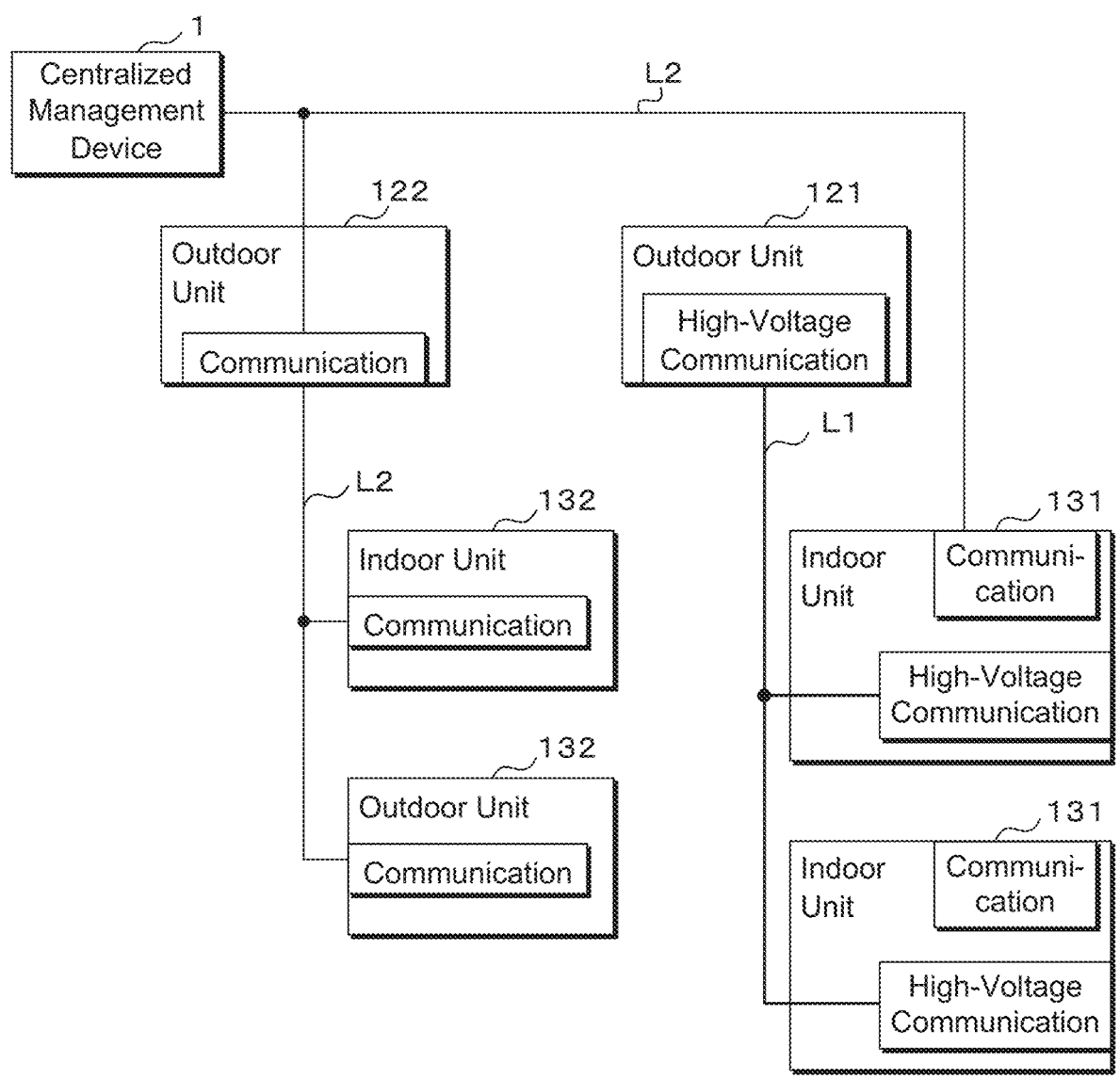
FIG. 4 is a block diagram illustrating the configuration of an air conditioning system according to a comparative example.

FIG. 4 is a block diagram illustrating the configuration of an air conditioning system according to a comparative example. The air conditioning system according to the comparative example is a system in which multiple air conditioning-related units are connected via multiple types of wiring L, but signals cannot be communicated interoperably. In FIG. 4, "communication" indicates a dedicated high-voltage communication circuit for communicating via the low-voltage power line L2, and "high voltage communication" indicates a dedicated low-voltage communication circuit for communicating via the high-voltage power line L1.

An outdoor unit 121 and multiple indoor units 131 according to the comparative example are connected via the high-voltage power line L1. The outdoor unit 121 and the indoor units 131 use the high-voltage communication circuits to transmit and receive signals using a dedicated high-voltage communication protocol. The indoor units 131 each include the low-voltage communication circuit. One of the indoor units 131 communicates with the centralized management device 1 using the low-voltage communication circuit via low-power power. The indoor unit 131 and the centralized management device 1 transmit and receive signals using a dedicated low-voltage communication protocol. The indoor unit 131 can communicate via the low-voltage power line L2 and communicate via the high-voltage power line L1, but cannot communicate signals interoperably with the high-voltage power line L1 and the low-voltage power line L2, and their communication protocols are also different. Therefore, the centralized management device 1 is unable to directly communicate with the outdoor unit 121. The centralized management device 1 is also unable to directly communicate with the indoor unit 131 that is not connected via the low-voltage power line L2.

An outdoor unit 122 and multiple indoor units 132 according to the comparative example are connected via the low-voltage power line L2. The outdoor unit 122 and the indoor units 132 use the low-voltage communication circuits to transmit and receive signals using a dedicated low-voltage communication protocol. The outdoor unit 122 is unable to directly communicate with the outdoor unit 121.

As described above, the air conditioning system according to the comparative example is such that a communication network utilizing the high-voltage power line L1 and a communication network utilizing the low-voltage power line L2 are not connected to enable interoperable signal communication. Therefore, the equipment with which air conditioning-related equipment can communicate is limited.

In contrast, according to the air conditioning system according to the present embodiment, a communication network utilizing the high-voltage power line L1 and a communication network utilizing the low-voltage power line L2 are connected to enable interoperable signal communication. The communication protocol is also standardized. Therefore, the individual air conditioning-related units can directly communicate across both the high-voltage power line L1 and the low-voltage power line L2.

<Effects of Operation>

According to the air conditioning-related equipment and air conditioning system according to the present embodiment, the air conditioning-related equipment can be connected to enable interoperable signal communication with a communication network including the high-voltage power line L1 and a communication network including the low-voltage power line L2 or the dedicated communication line.

The connection circuits 20 and 30 of the air conditioning-related equipment are provided with the isolation circuits 20b and 30b between the first connection portions 21 and 31 to which the high-voltage power line L1 is connected and the second connection portions 22 and 32 to which the low-voltage power line L2 or the dedicated communication line is connected. Therefore, signals can be communicated interoperably with the high-voltage power line L1 and the low-voltage power line L2.

The communication circuits 20d and 30d of the outdoor unit 2 and the indoor unit 3 are connected to the high-voltage power line L1 via the isolation circuits 20b and 30b. The outdoor unit 2 and the indoor unit 3 can communicate via the high-voltage power line L1.

The communication circuits 20d and 30d of the outdoor unit 2 and the indoor unit 3 are connected to the low-voltage power line L2 without the isolation circuits 20b and 30b interposed. The outdoor unit 2 and the indoor unit 3 can communicate via the low-voltage power line L2.

The outdoor units 2, the indoor units 3, and the refrigerant switching device 4 can receive high-voltage power supplied from other air conditioning-related equipment via the high-voltage power line L1 and operate.

The outdoor units 2, the indoor units 3, and the refrigerant switching device 4 can receive low-voltage power supplied from other air conditioning-related equipment via the low-voltage power line L2 and operate.

The outdoor units 2, the indoor units 3, and the refrigerant switching device 4 can supply high-voltage power to other air conditioning-related equipment via the high-voltage power line L1.

The outdoor units 2 and the indoor units 3 can transmit and receive low-frequency signals for recognizing the system and recognize the system. That is, the outdoor units 2 and the indoor units 3 can recognize air conditioning-related equipment within the same system as the system to which they are connected.

Since communication is performed in the high-frequency band, even if part of the communication path fails, air conditioning-related units that are successfully connected via the wiring L can continue to communicate in a relatively stable manner.

Since high-speed communication is possible, the air conditioning-related equipment can transmit and receive information other than control data for the air conditioning system. For example, information pertaining to maintenance and inspection can be transmitted and received.

Since the protocols for communication via the high-voltage power line L1, communication via the low-voltage power line L2, and communication via the dedicated communication line are standardized, the communication circuits 20d and 30d of the air conditioning-related equipment can communicate with air conditioning-related equipment interconnected using a common communication protocol.

The isolation circuits 20b and 30b can be configured with simple circuits including the capacitors C1 and C2 and the transformers Tr1 and Tr2.

The air conditioning-related equipment can transmit and receive signals using the shared line L12, which is one of conductor wires for transmitting high-voltage power, and the signal line L13. The high-voltage power line L1 can be used as an electric wire for communication, and signals pertaining to communication can be prevented from leaking into the power system.

Although the embodiment has been described above, it will be understood that various changes in form and details are possible without departing from the spirit and scope of the claims. Any part of the above embodiment may be optionally combined.

EXPLANATION OF REFERENCES 1 centralized management device
2 outdoor units
3 indoor units
4 refrigerant switching device
10 AC power source
20 connection circuit
20a high-voltage noise filter
20b isolation circuit
20c band-pass filter
20d communication circuit
20e control circuit
20f low-voltage noise filter
20g first transmission circuit
20h second transmission circuit
21 first connection portion
22 second connection portion
23 third connection portion
24 noise filter
25 rectifier smoothing circuit
26a inverter
26b outdoor fan
26c power circuit
27 low-pass filter
30 connection circuit
30a high-voltage noise filter
30b isolation circuit
30c band-pass filter
30d communication circuit
30e control circuit
30f low-voltage noise filter
30g first reception circuit
30h second reception circuit
31 first connection portion
32 second connection portion
33 third connection portion
34 noise filter
35 rectifier smoothing circuit
36b indoor fan
36c power circuit
37 low-pass filter
38 low-pass filter
39 power receiving circuit
C1 capacitor
C2 capacitor
L wiring
L1 high-voltage power line
L11 power line
L12 shared line
L13 signal line
L2 low-voltage power line

The invention claimed is:

1. Air conditioning-related equipment comprising:
a first connection portion to which a high-voltage power line is connected, the high-voltage power line including a power line for transmitting high voltage, a signal line for communication, and a shared line shared for high-voltage transmission and communication;
a second connection portion to which wiring dedicated to communication and not to power transmission or wiring for transmitting low voltage along with communication is connected; and
a connection circuit that connects the first connection portion and the second connection portion,
wherein
the first connection portion
is for connecting to other external air conditioning-related equipment via the high-voltage power line,
the second connection portion
is for connecting to other external air conditioning-related equipment via the wiring dedicated to communication and not to power transmission or the wiring for transmitting low voltage along with communication,
the connection circuit includes
a communication circuit that communicates via the high-voltage power line, and communicates via the wiring dedicated to communication and not to power transmission or the wiring for transmitting low voltage along with communication, and
an isolation circuit provided in front of the communication circuit, the isolation circuit blocking high-voltage power and transmitting a signal pertaining to communication,
the first connection portion is connected to the communication circuit via the isolation circuit, and
the second connection portion is connected to the communication circuit without the isolation circuit interposed.

2. The air conditioning-related equipment according to claim 1, comprising:
a third connection portion connected to an alternating current power source;
a power circuit connected to the third connection portion via a noise filter, and connected to the first connection portion via the noise filter and a high-voltage low-pass filter, the power circuit receiving high-voltage power supplied from the alternating current power source or high-voltage power transmitted via the high-voltage power line, and supplying main power to the air conditioning-related equipment; and
a power receiving circuit connected to the second connection portion via a low-voltage noise filter and a low-pass filter, the power receiving circuit receiving low-voltage power transmitted via the wiring connected to the second connection portion and supplying auxiliary power to the air conditioning-related equipment.

3. The air conditioning-related equipment according to claim 1, comprising:
   a first reception circuit that receives, via the high-voltage power line, a signal at a lower frequency than a frequency of a signal pertaining to communication via the high-voltage power line; and
   a second reception circuit that receives, via the wiring dedicated to communication and not to power transmission or the wiring for transmitting low voltage along with communication, a signal at a lower frequency than a frequency of a signal pertaining to communication via the wiring dedicated to communication and not to power transmission or the wiring for transmitting low voltage along with communication.

4. The air conditioning-related equipment according to claim 1, comprising:
   a power circuit connected to an alternating current power source and supplying main power to the air conditioning-related equipment,
   wherein high-voltage power of the alternating current power source is supplied to other air conditioning-related equipment via the high-voltage power line.

5. The air conditioning-related equipment according to claim 4, comprising:
   a first transmission circuit that transmits, via the high-voltage power line, a signal at a lower frequency than a frequency of a signal pertaining to communication via the wiring for transmitting high voltage along with communication; and
   a second transmission circuit that transmits, via the wiring dedicated to communication and not to power transmission or the wiring for transmitting low voltage along with communication, a signal at a lower frequency than a frequency of a signal pertaining to communication via the wiring dedicated to communication and not to power transmission or the wiring for transmitting low voltage along with communication.

6. The air conditioning-related equipment according to claim 1, wherein:
   high-voltage power is transmitted using the power line and the shared line, and the communication circuit communicates via the signal line and the shared line.

7. The air conditioning-related equipment according to claim 1, wherein:
   the isolation circuit includes
   a transformer or a capacitor.

8. An air conditioning system comprising:
   first air conditioning-related equipment according claim 1; and
   second air conditioning-related equipment connected to the first air conditioning-related equipment via the high-voltage power line, the wiring dedicated to communication and not to power transmission, or the wiring for transmitting low voltage along with communication,
   wherein the first air conditioning-related equipment communicates with the second air conditioning-related equipment via the high-voltage power line, the wiring dedicated to communication and not to power transmission, or the wiring for transmitting low voltage power along with communication.

9. An air conditioning system comprising:
   first air conditioning-related equipment according claim 1; and
   second air conditioning-related equipment connected to the first air conditioning-related equipment via the high-voltage power line; and
   third air conditioning-related equipment connected to the first air conditioning-related equipment via the wiring dedicated to communication and not to power transmission or the wiring for transmitting low voltage power along with communication,
   wherein the first air conditioning-related equipment communicates with the second air conditioning-related equipment via the high-voltage power line, and communicates with the third air conditioning-related equipment via the wiring dedicated to communication and not to power transmission or the wiring for transmitting low voltage along with communication.

* * * * *